(12) United States Patent
Shotey et al.

(10) Patent No.: US 6,511,343 B1
(45) Date of Patent: *Jan. 28, 2003

(54) RECEPTACLE-MOUNTED COVER PLATE TO HIDE ELECTRICAL SOCKET FACE

(75) Inventors: Michael J. Shotey, Scottsdale, AZ (US); Edgar W. Maltby, Mesa, AZ (US)

(73) Assignee: TayMac Corporation, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,761

(22) Filed: Jul. 12, 1999

Related U.S. Application Data

(63) Continuation of application No. 08/775,382, filed on Dec. 30, 1996, now Pat. No. 5,965,846.

(51) Int. Cl.[7] .......................... H02G 3/14; H01R 13/66
(52) U.S. Cl. .......................... 439/536; 174/66; 220/241
(58) Field of Search .................. 439/536; 174/66, 174/67; 220/241, 242; D8/350, 351, 352, 353; D13/143, 137

(56) References Cited

U.S. PATENT DOCUMENTS

| | | | |
|---|---|---|---|
| 943,958 A | 12/1909 | Wheeler | |
| 949,646 A | 1/1910 | Pratt | |
| 1,228,731 A | 6/1917 | Abbott et al. ................. 220/3.8 |
| 1,759,300 A | 5/1930 | Cunningham ................ 174/53 |
| 1,784,277 A | 12/1930 | Darlington ................... 220/241 |
| 1,926,001 A | * 9/1933 | Goodridge .................... 174/67 |
| 2,043,865 A | 6/1936 | Place ........................... 179/66 |
| 2,321,640 A | 6/1943 | Adkins ......................... 220/3.8 |
| 2,596,236 A | 5/1952 | Glosier ......................... 220/3.8 |
| 3,432,611 A | 3/1969 | Gaines et al. ............... 220/24.2 |
| 3,438,534 A | 4/1969 | Zerwes ......................... 220/27 |
| 3,518,356 A | 6/1970 | Friedman .................... 220/24.2 |
| 3,530,230 A | 9/1970 | Cormier et al. ............. 220/24.2 |
| 3,544,703 A | 12/1970 | Jones ........................... 174/66 |
| 3,965,287 A | 6/1976 | Mueller ........................ 174/66 |
| 4,032,030 A | 6/1977 | Bass et al. .................... 174/66 |
| 4,500,746 A | 2/1985 | Meehan ........................ 174/58 |
| 4,737,599 A | 4/1988 | Fontaine ....................... 174/67 |
| 4,833,277 A | 5/1989 | Jacoby, Jr. et al ............ 174/66 |
| 4,970,349 A | * 11/1990 | Jones ........................... 174/67 |
| 4,972,045 A | * 11/1990 | Primeau ....................... 174/66 |
| 5,342,995 A | * 8/1994 | Comerci ....................... 174/67 |
| 5,362,924 A | 11/1994 | Correnti ....................... 174/67 |
| 5,763,831 A | 6/1998 | Shotey et al. ................. 174/67 |
| 5,835,980 A | * 11/1998 | Houssian ...................... 174/67 |
| 5,965,846 A | * 10/1999 | Shotey et al. ................. 174/66 |
| 6,160,219 A | * 12/2000 | Maltby et al. ................ 174/66 |

OTHER PUBLICATIONS

U.S. Patent Pending, 09/456,089, Filing Date Dec. 6, 1999, Shotey, et al.
34 UL 514 C–38, Dec. 26, 1996., pp. 34–55.
Pass & Seymour, "TradeMaster Weatherproof While–in–Use–Covers", Apr., 1999, Catalog No. WIUC20C.

\* cited by examiner

*Primary Examiner*—Tho D. Ta
*Assistant Examiner*—Ann McCamey
(74) *Attorney, Agent, or Firm*—Schmeiser, Olsen & Watts LLP

(57) ABSTRACT

An easily-installed cover plate for hiding the face of sockets by covering an electrical outlet, including the face of the sockets. The cover plate is mounted over the receptacle and has apertures for plug blades. In the preferred embodiment, the cover plate is rectangularly shaped to cover a duplex receptacle, having apertures to receive plug blades and a center hole for receiving a screw which secures the cover plate over the duplex receptacle.

13 Claims, 2 Drawing Sheets

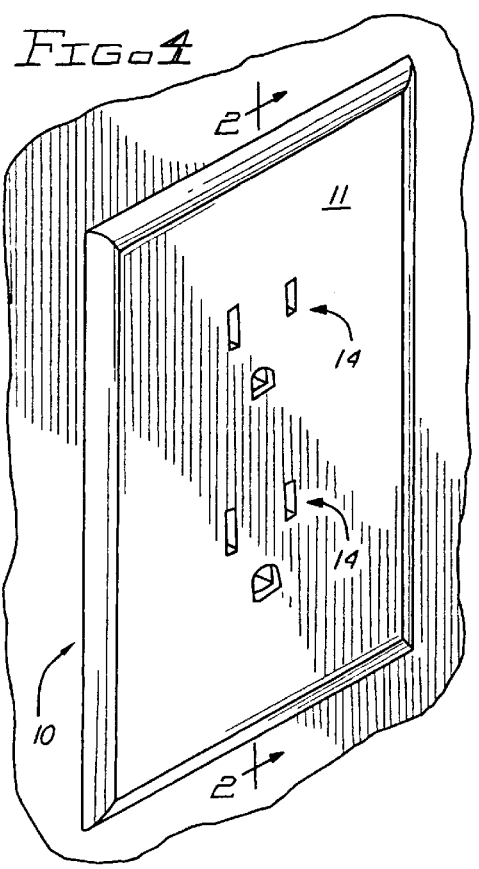
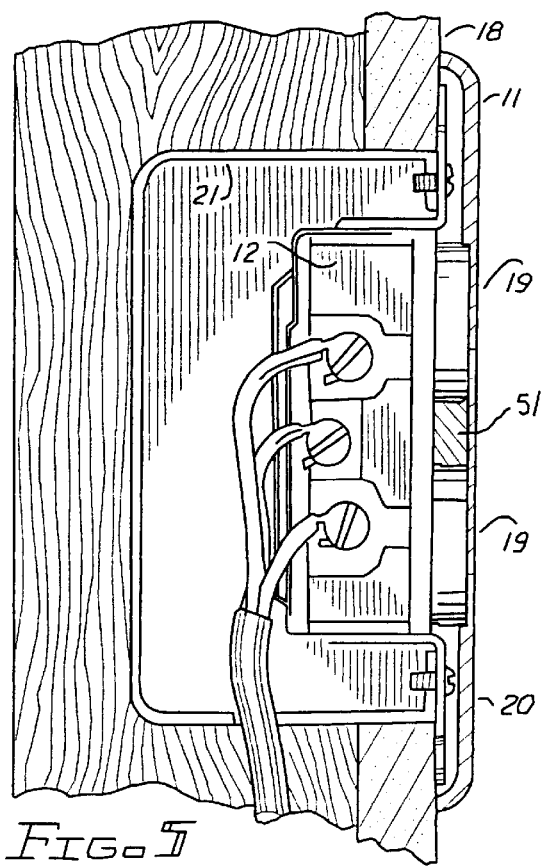

RECEPTACLE-MOUNTED COVER PLATE TO HIDE ELECTRICAL SOCKET FACE

This application is a continuation of Ser. No. 08/775,382, filed Dec. 30, 1996 now U.S. Pat. No. 5,965,846.

BACKGROUND OF THE INVENTION

This invention relates generally to cover plates for electrical outlets and more particularly to a simplified means to cover the face of unattractive electrical sockets and thereby make the outlet more aesthetically pleasing.

Conventional electrical outlets are made of several components, including a wall box and a receptacle, which is typically composed of pairs of sockets and a yoke. The receptacle is typically attached to the wall box that is typically attached to a framing member inside the wall, and is accessible through a hole cut in the wall. A cover plate having apertures to allow the sockets to protrude is installed over these components, typically with one or two screws. Electrical devices are plugged in by inserting the plug blades through aligned apertures in the cover plate and socket.

A cover plate is installed after construction. It is common practice to remove the cover plate during remodeling or redecorating so that it does not become damaged or defaced with paint drips and splatters, wallpaper paste, or other decorating materials. The conventional cover plate is easily removed by unscrewing the screw or screws that attach it directly to the receptacle. However, the receptacle is not usually removed during remodeling or redecorating because it is hard-wired into the building's electrical system. Consequently, the receptacle and sockets are left exposed and the face of the sockets become covered with paint splatters and the like. If not cleaned immediately, the face may become permanently defaced, thereby making the electrical outlet more unsightly and conspicuous. Repeated paintings only make the problem worse. Reinstalling the cover plate then emphasizes the paint-splattered surface of the outlet, as the defaced socket surface is compared to the pristine surface of the cover plate.

Cover plates are now available in a variety of colors and decorator textures to more closely go with any decor, and sometimes are even covered with wallpaper to match the wall. However, the underlying receptacles and cover plates are made in standard colors, usually beige and dark brown, and unfortunately do not match many decorative cover plates. Because most cover plates allow the face of the sockets to be exposed, such mismatched sockets and cover plates cause the outlets to be more conspicuous. It is desirable, then, to provide a cover plate that can be installed over existing receptacles that covers not only the wall box assembly, but the face of the sockets, too, in order to make the outlet less conspicuous and more attractive.

Decorative cover plates known in the art generally attempt to make outlets more attractive by attaching a new cover to existing cover plates. For example, in U.S. Pat. No. 1,784,277 Darlington describes an ornamental cover for a light switch manufacturable in many colors. The cover is a multilayer pad of adhesively-backed sheets which is adhesively attached to the existing cover plate. When desired, a decorative sheet may be removed, exposing a new sheet. In U.S. Pat. No. 4,312,458, Stewart describes a fabric slipcover for an existing cover plate. In U.S. Pat. No. 3,840,692 Wells describes an outsized cover plate that is screwed over an existing cover plate. Because these decorative cover plates overlay the existing cover plate, these inventions result in a cover that projects farther from the wall than the original cover plate, thereby making the outlet even more noticeable.

More complex devices have been invented to achieve an aesthetically pleasing electrical outlet. For example, U.S. Pat. No. 5,180,886 issued to Dierenbach describes an entire wall box assembly to provide an attractive designer-style appearance. The decorative appearance is achieved with the use of a multi-component cover plate requiring a plurality of attachment means to secure the components in place.

The prior art also describes removable paint shields to protect the sockets and cover plates during painting. In U.S. Pat. No. 5,003,128 Grondin describes a cover that removably adheres to an existing cover plate of an electrical outlet so that the electrical elements are protected during painting. The device completely covers the receptacles such that a plug may not be inserted. Gilchrist describes a paint shield in U.S. Pat. No. 5,285,014 that also covers all exposed surfaces of an electrical outlet. The shield is temporarily attached using suction or adhesives, or with prongs that fit snugly in the socket apertures. While these devices do protect the outlets if installed before painting, they do not remedy the situation where the sockets are already defaced. Similarly, these covers do not make a mismatched outlet match a new decor, and therefore do not provide a means for making the outlets more attractive.

Other patents describe inventions that replace existing cover plates to improve safety of the outlet. In U.S. Pat. No. 5,165,042 Klinger describes a decorative safety cover plate that replaces the existing plate. This invention comprises a base plate and a decorative face plate that slides between a dosed position where the sockets are occluded, and an open position where the sockets are exposed. Barla describes a safety cover plate in U.S. Pat. No. 5,240,426 that replaces the existing cover plate. The plate has manually positionable shutters to occlude the entire socket so that plugs may not be inserted. While improving safety, these devices are multi-component parts that are relatively expensive, more difficult to install, and prone to breaking. They also suffer the same problem as the known decorative cover plates: they project farther from the wall than the original cover plate, thereby making the outlet even more noticeable.

The problem of defacing electrical receptacles during painting is age-old, the prior art showing remedies attempting a simpler means to cover the face of unattractive electrical sockets and thereby make the outlet less conspicuous dating back to the early 1900's. Nevertheless, a simple, easily-installed, inexpensive cover plate to make existing outlets more attractive has evaded invention. There has existed a long-felt need for a simple, inexpensive way to make electrical outlets more attractive, without having to resort to replacing the receptacle or entire wall box assembly, or making the outlet project even farther from the wall.

The primary objective of this invention is to provide a simplified means to cover the face of unattractive electrical sockets and thereby make the outlet less noticeable. This objective is achieved with the several embodiments described below and in the accompanying claims and drawings. Variations and modifications which are in the spirit of this invention and known to those skilled in the art are considered to fall within the scope of this patent.

BRIEF SUMMARY OF THE INVENTION

This invention provides a simple, easily-installed cover plate that hides the face of sockets by covering an electrical outlet, including the face of the sockets. The cover plate is mounted over the receptacle and has apertures for plug blades. Several embodiments of the present invention are presented to achieve these objectives. In the preferred embodiment, the cover plate is rectangularly shaped to cover a duplex receptacle, having apertures to receive plug blades and a center hole for receiving a screw which secures the cover plate over the duplex receptacle.

BRIEF DESCRIPTION OF THE DRAWINGS

FIG. 4 is a perspective view of a cover plate according to another preferred embodiment of the invention; and FIG. 5 is a cross sectional view taken along line 2—2 of FIG. 4.

DESCRIPTION OF THE SEVERAL EMBODIMENTS

Figure 1:
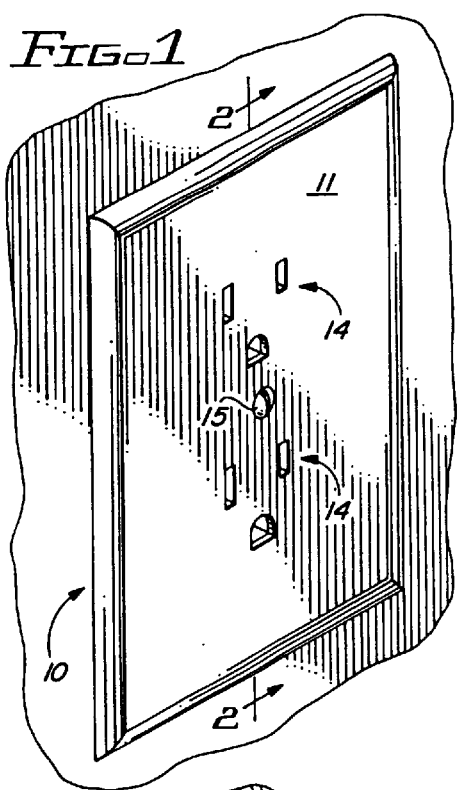
FIG. 1 is a perspective view of the cover plate installed over an existing receptacle.
Figure 2:
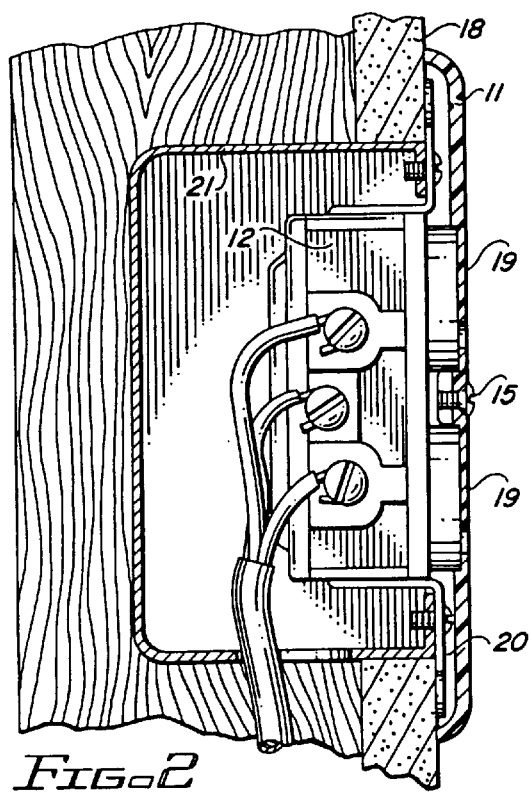
FIG. 2 is a cross-sectional view taken along the line 2—2 of FIG. 1.
Figure 3:
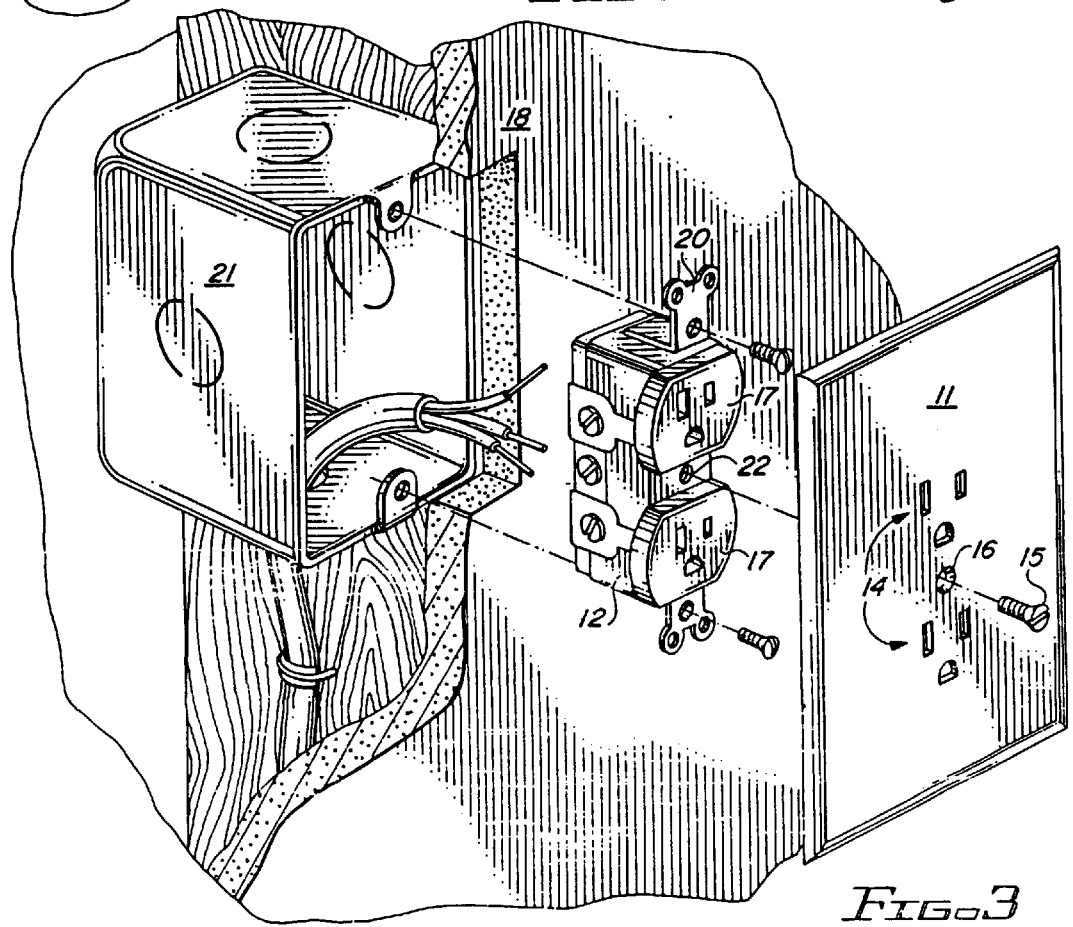
FIG. 3 is an exploded view of the cover plate installed over an existing receptacle.

Referring to FIGS. 1–3, where like indicia refer to like parts, the preferred embodiment of the invention, denoted generally as 10, is illustrated as installed over an existing receptacle 12. The cover plate 11 has a set of apertures 14 for plug blades. A screw 15 is inserted through another aperture 16 to secure the cover plate 11 over the existing receptacle 12.

In conventional outlets, the sockets 17 extend beyond the plane of the wall 18 through apertures in the conventional cover plate (not shown). Ideally, the cover plate and the face of the sockets are flush, which necessitates that the conventional cover plate project approximately 0.20–0.25 inches from the wall. In the present invention, the cover plate 11 is specifically designed to cover the face of the receptacle 12 and its sockets 17, so there are no apertures for the sockets. Instead, the cover plate 11 is adapted to receive the face of the socket 17 against the reverse side of the cover plate 11. See. FIG. 2. While the front of the cover plate 11 is of smooth or uniform topography, in the preferred embodiment the reverse side of the cover plate 11 has depressed, thinned areas 19 defining receiving areas for the face of the sockets. By fitting the face of the sockets into these thinned areas when the cover plate 11 is installed, the cover plate 11 of the present invention projects beyond the plane of the wall approximately the same distance as a conventional cover plate. Preferably the thinned areas 19 are sufficiently large for easy installation over any socket face.

While the shape of the thinned areas need not coincide with the shape of the socket, the thinned areas can be manufactured to precisely match the shape of the socket. The cover plate is stronger and more durable with smaller thinned areas, however. With the more durable embodiment of the cover plate, the cover plate can also protect the receptacle from damage due to rough handling. For example, if a plug inserted into an outlet with a conventional cover plate is yanked out of the wall sideways, that is, substantially parallel to the wall, the forces applied to the sockets can cause the receptacle to be jarred loose or to crack. A cover plate of the present invention can help protect the receptacle because as the plug is pulled sideways from an outlet having the present cover plate, the applied forces act on the present cover plate, reducing or eliminating the forces on the receptacle.

Referring now to FIG. 3, it shows an exploded view of the preferred embodiment cover plate 11 installed over an existing receptacle illustrating the cover plate 11, receptacle 12, sockets 17, yoke 20, wall box 21, and wall 18. The cover plate 11 is secured over the receptacle 12 by inserting a screw 15 through at least one securing aperture 16 into aligned, mated, threaded receiving apertures 22 in the receptacle 12 or yoke 20. For example, conventional receptacles have a threaded receiving aperture centered between the sockets for receiving a screw while other outlets have a pair of receiving apertures placed at opposite ends of the receptacle in the yoke. The present invention may be made to accommodate any underlying receptacle, although only the preferred embodiment is shown in the figures. If necessary to strengthen the cover plate's securing aperture, a flange may surround the securing aperture, projecting outwardly from the reverse side of the cover plate.

Alternative means may be used for securing the cover plate 11 over the receptacle. In particular, a pin may be inserted through at least one securing aperture into aligned, mated receiving aperture or apertures in the receptacle or yoke. If securing apertures are not desired, the cover plate may be adhesively attached over the receptacle or yoke. Furthermore, the cover plate may be snapped onto the receptacle by fitting the sockets snugly into the depressed, thinned areas that have been manufactured to precisely match the shape of the socket.

The number of apertures in the cover plate for receiving plug blades is dependent on the number of blades on the plug. Typically, the number and position of apertures on the cover plate will match the number and position of apertures on the receptacles, although fewer apertures may be used on the cover plate to occlude apertures in the sockets, if desired. Conventional dual receptacle outlets have two sets of apertures, one set for each socket. In addition to outlets having different number of apertures, outlets may have varying numbers of sockets. For example, conventional outlets have two sockets and are known as one-gang outlets as shown in FIGS. 1–3. Two-gang outlets are also common. The cover plate of the present invention can be made with corresponding number and placement of apertures to match and align with the number of underlying sockets.

The cover plates of the present invention typically have outside dimensions that substantially match a conventional or existing cover plate, but the cover plates herein described may be designed in any desired size and shape to enhance the appearance of the electrical outlet.

We claim:

1. A cover plate for an electrical outlet having a receptacle with at least one securing aperture for receiving a securing means, and at least one socket having at least two apertures for receiving plug blades, the cover plate comprising:

at least one securing aperture through the front surface that aligns with the securing aperture in the receptacle such that the securing means can be received through the cover plate securing aperture into the receptacle securing aperture;

at least two apertures through the front surface that align with the apertures of each socket such that plug blades can be received through the cover plate apertures into the socket apertures; and a front surface having a uniform topography other than the apertures therethrough;

wherein the cover plate is free of any apertures other than the at least one securing aperture that aligns with the securing aperture in the receptacle and the at least two apertures that align with the apertures in each socket.

2. The cover plate of claim 1 wherein the cover plate has a back surface opposite the front surface, wherein the back surface has at least one thinned receiving area sized to receive at least one socket of the receptacle such that the cover plate fits snugly over the socket.

3. A cover plate for an electrical outlet comprising:
- a rectangular cover plate having a front side and a reverse side;
- at least one securing aperture aligned with at least one aperture in an electrical receptacle for receiving securing means;
- at least two apertures aligned with at least two apertures in the electrical receptacle to receive plug blades;
- wherein the reverse side has at least one thinned receiving area sized to receive at least one socket of the receptacle;
- wherein the front side is of uniform topography other than the apertures therein.

4. The cover plate of claim 3, wherein the thinned receiving area of the reverse side of the cover plate comprises a recess sized to receive the socket of the receptacle such that the cover plate fits snugly over the socket.

5. A cover plate for an electrical outlet, the electrical outlet having a receptacle with at least one securing aperture and at least one socket face having at least two apertures for receiving plug blades, the cover plate comprising:
- a front side having a front surface region with at least two apertures extending therethrough which align with apertures of the receptacle;
- wherein the front surface region is of uniform topography other than the at least two apertures therethrough and the front side is free of any apertures other than the at least two apertures which align with apertures of the receptacle.

6. The cover plate of claim 5, wherein the cover plate is formed as a single, solid component except for the at least two apertures which align with apertures of the receptacle.

7. The cover plate of claim 5, wherein the at least two apertures in the surface of the cover plate comprise at least one securing aperture in the cover plate aligned with a securing aperture in the receptacle.

8. The cover plate of claim 5, wherein the cover plate further comprises a back surface having at least one recessed portion sized to receive the socket face of the receptacle.

9. A cover plate for an electrical outlet having at least one socket with a socket face having apertures therethrough, the cover plate comprising:
- a front surface region corresponding to the at least one socket face and having a plurality of apertures for receiving plug blades and at least one aperture for receiving a securing means, the front surface region otherwise having uniform topography, wherein the cover plate hides the at least one socket face;
- wherein the cover plate is formed as a single, solid component except for the plug blade apertures and the securing means aperture.

10. The cover plate of claim 9, wherein the cover plate further comprises a front side which includes the front surface region, and a reverse side opposite the front side, wherein the reverse side includes at least one structure configured to align the apertures in the front surface region on the front side of the cover plate with the apertures of the socket face.

11. The cover plate of claim 10, wherein the at least one structure configured to align the apertures includes at least one recessed portion in the reverse side sized and shaped to fit snugly over the socket face.

12. The cover plate of claim 10, wherein the at least one structure configured to align the apertures includes at least one protrusion extending from the reverse side of the cover plate.

13. The cover plate of claim 12, wherein the at least one protrusion includes a flange surrounding the securing means aperture.

* * * * *